United States Patent [19]

Stouffer et al.

[11] 4,388,950
[45] Jun. 21, 1983

[54] FLUID FLOW CONTROL ELEMENT HAVING MOVABLE VALVE AND METHOD

[75] Inventors: Ronald D. Stouffer, Silver Spring; Joseph W. Morris, Columbia, both of Md.

[73] Assignee: Bowles Fluidics Corporation, Silver Spring, Md.

[21] Appl. No.: 214,555

[22] Filed: Dec. 9, 1980

[51] Int. Cl.³ .............................. F15C 3/00; F15C 1/08
[52] U.S. Cl. ........................................ 137/829; 137/839; 137/875
[58] Field of Search ................ 137/829, 830, 831, 832, 137/834, 839, 804, 805, 819, 820, 821, 822, 835, 806

[56] References Cited

U.S. PATENT DOCUMENTS

| | | | |
|---|---|---|---|
| 3,053,276 | 9/1962 | Woodward | 137/829 |
| 3,187,763 | 6/1965 | Adams | 137/839 |
| 3,605,780 | 9/1971 | Kranz | 137/875 |
| 3,621,859 | 11/1971 | Scott | 137/829 |
| 3,745,906 | 7/1973 | Kakei et al. | 137/835 X |
| 3,754,576 | 8/1973 | Zetterstrom et al. | 137/809 |
| 3,799,246 | 3/1974 | Osheroff | 165/35 |
| 4,052,002 | 10/1977 | Stouffer et al. | 137/835 X |
| 4,170,259 | 10/1979 | Kumagai et al. | 165/11 |
| 4,223,720 | 9/1980 | d'Orsay | 165/14 |

FOREIGN PATENT DOCUMENTS 52-67818  6/1977  Japan ................................ 137/875

*Primary Examiner*—A. Michael Chambers
*Attorney, Agent, or Firm*—Jim Zegeer

[57] ABSTRACT

A fluid flow control element is constituted by a fluidic amplifier having an interaction region shaped to provide side walls leading to a pair of fluid flow outlets. The fluid flow inlet for the fluidic amplifier has positioned adjacent thereto at least one control fluid passageway, and the flow of fluid to the outlet passages is controlled by at least one pivoted valve or flap element pivoted between two positions for controlling flow fluid from the fluid inlet to a selected one of a pair of fluid flow passageways or outlets. In the preferred embodiment the fluid flow inlet and outlet and the interaction chamber are such that the fluid pressure in the chamber is always above any pressure in the load passageways and fluid from the fluid flow inlet flows out from the chamber through the control passage. The pivoted valve or flap element, in the preferred embodiment is flat so that it is balanced relative to gravity as well as aerodynamically, so that it will not change position due to back pressures as when outlet passages or receivers are partially or completely blocked and does not cause any torque on the valve element about said pivot and hence will remain in the control position despite severe back loading. The invention is described in relation to a low pressure system, such as automobile air flow systems wherein a number of the unique aspects of the invention are utilized.

19 Claims, 6 Drawing Figures

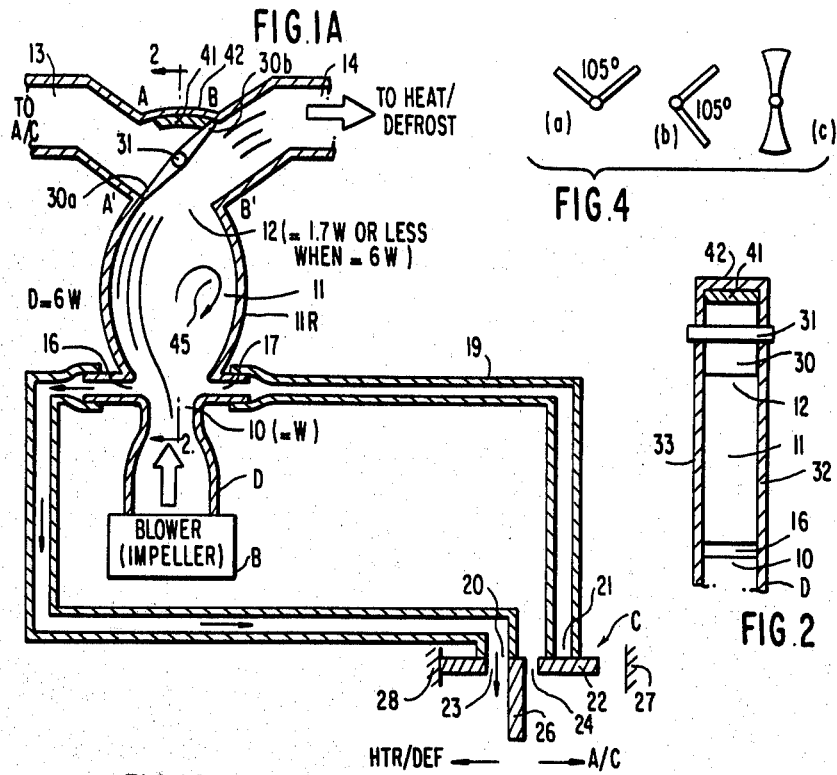

FLUID FLOW CONTROL ELEMENT HAVING MOVABLE VALVE AND METHOD

The present invention is directed to a fluid flow control element and more particularly to a pure fluidic amplifier and still more particularly to a valve element controlled thereby.

Pure fluid amplifiers have not found wide acceptance in fluid flow control applications because a major drawback is that they are load sensitive. The use of a triangularly shaped pivotal flap member controlled by a fluidic amplifier element, is disclosed in Zetterstrom et al U.S. Pat. No. 3,754,576. In this patent, a fluid flow control element is disclosed in which a fluidic amplifier having an interaction region bounded by coanda attachment walls, a fluid flow inlet at the upstream end of the interaction region, and a pair of downstream fluid flow outlets at the downstream end of the interaction region, and a pair of control fluid inlets adjacent the fluid inlet and a triangularly shaped flap member at the branching point of the fluid flow outlets, the triangular flap member is located downstream of the control fluid flow inlets and has its apex end serving somewhat as a movable splitter and is actuated by fluid flow guided into either of the pair of fluid flow outlets, the triangular flap member being automatically switched over to a position with one fluid outlet being fully open and the other fluid outlet being fully closed thereby. The position of the flow of the fluid stream relative to the triangular flap member is controlled by deflecting the fluid stream issuing from the fluid flow inlet to cause the triangular flap member to rotate on its pivot and switch the fluid flow to the opposite fluid flow outlet. In this patent, the position of the door can not be maintained with a fully blocked outlet because some small leakage is required. In the wall attachment type fluidic element disclosed in this patent, high impedance on both outputs (which would correspond to loading or blockage of the outputs) will cause the controls to reverse their sense if used passively. Moreover, the valve or flap element in this patent requires more force to be actuated because the relationship of the pressurized surface to the pivot point, and the patent embodiment appears to be oriented to hydraulic applications, although it indicates gaseous fluids may be used.

In accordance with the present invention, a fluid flow control element is provided having a fluid flow inlet coupled to fluid flow outlet by an interaction region, or chamber at least one control fluid inlet and at least one pivotal valve or flap element pivotable between a pair of positions, the valve element being in position for controlling flow of fluid from the fluid flow outlet to a selected one of the pair of fluid flow outlet passageways. The interaction chamber between the fluid flow inlet and the fluid flow outlet, in the preferred embodiment, is constituted by a chamber having parallel top and bottom walls and a pair of opposed side walls each side wall being concavely curved so that the flow is along one side wall and is maintained there by vortex forces and is that fluid flow which is directed through the one of said pair of fluid flow outlets on the opposite side thereof. In the preferred embodiment, the interaction region or chamber is pressurized relative to ambient and there is positive flow from the interaction region or chamber to the control passageways. In a preferred embodiment the interaction region is pear shaped and the valve or flap element (also sometimes identified as a door element in automobile air flow systems) is balanced in two ways: (1) relative to gravity (so the element can be operated in any orientation), and (2) the flap or door is aerodynamically or fluidynamically balanced so that the output passageway or receiver pressures will not change the position of the door nor will back pressures, even those due to a completely blocked outlet passageway or receiver, put a torque on the door. By balance, it is meant equal areas and identical shapes of the door (or that if the areas are unequal the resulting moments are equal). Since the preferred embodiment of the present invention relies on an inherently positive interaction region, high impedances on both of the outputs will not cause the controls to reverse their senses when they are used passively e.g. fluid flows from the interaction region. In view of the pear shape, 50% of the door or valve element is impinged upon by the power stream for switching purposes in accordance with the present invention. Finally, if the valve or flap element leaks at its edges, a moment is generated which will maintain the door in the closed position. The preferred embodiment is used in conjunction with conventional automobile air flow systems, especially air-conditioning, heater and defrost controls.

DESCRIPTION OF THE DRAWINGS

The above and other objects advantages and features of the invention will become more apparent when considered in light of the accompanying drawings wherein:

FIG. 1(a) is a top cut-away plan view of a preferred embodiment of the invention, FIG. 1(b) is a partial of the same now showing the valve operated to the opposite side, FIG. 2 is a cross-sectional view through line 2—2 of FIG. 1a, FIG. 3(a) illustrates a further embodiment of the invention schematically indicating the invention incorporated in an automobile air flow system, and FIG. 3(b) is an illustration of the same embodiment with the valve or door element operated to the opposite side and, FIGS. 4(a), 4(b) and 4(c) are top plan views of a further modifications of the valve, flap or door element.

DETAILED DESCRIPTION OF THE INVENTION

The invention has been developed in relation to air flow systems in automobiles for the heater, vent and air-conditioning systems as well as the defrosting flow control. In the past, valve elements or "doors" were operated by vacuum motors which are normally present and supplied by engine vacuum. In smaller cars and particularly with respect to fuel injection engines, engine vacuum will no longer be available or if present at least to a much less extent. Proposals have been made to provide a vacuum pump or use electric motors or solenoids for operating the doors but these expensive solutions can be avoided by the present invention which depends solely on blower air as the energy source to activate the door (flat or valve element). In the preferred embodiment of the invention, the interaction region is always positive no matter what the output passageway resistance or impedance (e.g. loading) may be. Therefore, the controls will always have the same polarity. Moreover, the door only serves to aid the output flow to be binary thus, the door aids in maintaining the flow in the single desired output passsageway or leg in spite of possible rises in impedance or resistance in the output passageways legs such as the partial or full shutting off of one or more registers as in the air-conditioning mode or the laying of paper or other articles on the output duct for the defrost mode. In a preferred embodiment of the present invention, the interaction region is elliptically shaped and has concavely shaped walls which first diverge and then converge toward each other beyond the outlet thereof so that a vortex is formed and is the main operative in establishing the binary nature of the flow pattern in the interaction region and the switching of the flow is less effected by changes in the output resistance leg or loading. Also, the physical dimensions of the interaction region may be made smaller than for coanda type wall attachment configurations as disclosed in the Zetterstrom et al patent. However other aspects of the invention may be used in connection with coanda wall attachment amplifiers.

The invention will be described in connection with the blower operated door of a heater/defrost/air-conditioning system of an automobile. In general automobile air flow systems can vary widely from automobile to automobile, even from the same manufacturer; hence the illustrations are highly schematic and are intended to be generic to all automobile air flow systems. With reference to FIG. 1, a blower, or impeller B, supplies air under pressure to duct or channel D and nozzle 10 having a width W and constituting a fluid inlet to an interaction region or chamber 11 which feeds through an outlet or throat 12 to a pair of fluid outlet passages or receivers 13 and 14, which corresponds to flow of air through an air-conditioning unit or through a heating unit and thence to a defroster or heat outlet in the passenger compartment of the automobile. It will be appreciated that a similar element may be utilized to control the flow of air upstream or downstream to other portions of the system. For example, if the fluid flow outlet passageway 14 directs air to flow through a heating core, the air may then be directed to heat the passenger compartment directly or directed upon the windshield in the manner disclosed in U.S. application Ser. No. 30,794 filed Apr. 17, 1979 and PCT Application PCT/US80/00368, assigned to the assignee hereof, both of which are incorporated herein by reference.

A pair of fluid control passageways 16 and 17 on the left and right sides, respectively of the fluid inlet 10 are coupled by passageways 18 and 19, respectively to a control means C, which can, as illustrated by a simple slide or rotary valve. It will be appreciated that the invention can be adapted by utilizing only one control line the other being a partially closed control.

Control line 18 leads to an aperture 20 and control line 19 leads to aperture 21. Slide valve plate 22 has an aperture 23 which, in the position illustrated is in alignment or in registry with the outlet 20 for the left control port 16 and an opening 24 which, when the control plate 22 is moved to the right by a handle 26, for example, against stop 27 to thereby bring opening 24 in registry with aperture 21 of the left control passage 19. By moving the valve plate 22 to the left or right against its respective stops 27 and 28 fluid can flow from the chamber 11 through passage 18 or 19 to exit through one of the registered openings 20-23 or 21-24. It will be appreciated that many other kinds of control can be utilized and they can be detented to retain a given position.

As noted earlier, in the preferred embodiment the interaction region 11 is maintained under pressure relative to the ambient so that the flow of air is out from the chamber through the passageways 18 and 19, and since the fluid is air, release or venting of it to the passenger compartment is of no consequence.

Just beyond the outlet throat 12 and between passageways 13 and 14 leading to the air-conditioning and heat/defrost passageways, respectively, is a flap or valve element or door 30. Door 30, in this preferred embodiment is flat, that is, it spans 180°, and has a central pivot 31 which is journaled in the parallel bounding walls 32, 33. The flap or valve element 30 is constituted by two sections 30a and 30b, which are colinear in the preferred embodiment. However, they can be at an obtuse angle ranging from 90° through 270° relative to one another as is illustrated in FIGS. 4a and 4b. In this preferred embodiment of FIG. 1, the door is balanced and hence is independent of gravity, whereas the obtuse angled doors (illustrated in FIGS. 4(a) and 4(b)) may be sensitive to gravity.

A stop element 40 is arcuately shaped to conform to the arcuate curvature of the section 41 of the outer boundary wall 42, the arcuate curvature being such as to accomodate the rotary movement of the resective ends of the elements 30a and 30b or door or valve element 30. In the position illustrated, the air is directed through the heat/defrost system or the vehicle. In this case, control passage 18 and its outlet 20 is in registry with opening 23 and slide valve 22. Since the interaction region 11 is pressurized, fluid flows in the direction of the arrows through the passage or tube 18 to exit to the ambient. Pressurized fluid in this case is also flowing along the concave side wall 11L of the interaction region 11 and, at the same time, a vortex 45 has been created in the right side of the interaction region 11 which maintains the flow along wall 11L. The pear or elliptical shape of the interaction region or chamber and the function of the vortex 45 in maintaining the fluid flow along the walls of the interaction region as well as the design of the inlet 10, outlet 12 and chamber 11 such that the pressure is above ambient are known in the art of fluidics, see Stouffer and Bray U.S. Pat. No. 4,052,002 assigned to the assignee hereof and incorporated herein by reference.

The curvature of the wall is such that it directs the flow of air on one side of flap element 30 and thence outwardly through passageways or fluid flow outlet 14. Since the interaction region 11 is under pressure, any back loading or a high impedance such as the laying of papers books and articles upon the defrost outlet register can not change the position of flap valve 30. Moreover, the vortex 45 aids in maintaining the flow against side wall 11L, the flap valve element surfaces 30 channeling the flow of air in this direction and blocking the flow of air through outlet flow passage 13. Note that the flow through outlet 12 is from the left side 11L towards the right outlet 14 with the power stream crossing over as shown. This indicates the positive pressure in the interaction region, that is, the blocking of the right control port leads to an output on the same side. Blocking the left fluid control flow 16, 18, 20 and 23 and unblocking the right fluid control passage 17, 19, 21 and 24 exerts a deflecting force on the fluid issuing through a fluid inlet flow passage or opening 10 to cause the fluid to flow along the right curved wall 11R of the interaction region 11. When this happens, the crossover of the fluid by virtue of the curved wall 11R directs the fluid against 50% of the door or flap 30 surface at an impingement angle of about 90° causing it to rapidly pivot and engage the stop 42 so that the air now is passed or directed through fluid flow outlet passage 13.

Even when the output passage with which the air is being directed at a given period of time is blocked, this would not cause the switching of the flap element or door.

The embodiment illustrated in FIGS. 1 and 2 therefor has the following advantages: when operated as the control door for air-conditioning, heater and defrost of an automobile, it operates on blower air which may in some cases be very low (lower than 0.2 inches $H_2O$).

It requires only blocking or unblocking of a control port to switch state e.g. a passive system not requiring an additional fluid source and a return line from the controller which is usually inherently located on the instrument panel of the automobile. Control ports can be partially blocked or biased and still provide switching so that only one control port need be used. Air flow through the control passage is merely to the passenger compartment and hence of no significant consequence since it is a very small amount. Operation is independent of orientation and you can block the active output passage completely and still not force the switching of the flap or valve element. The invention as disclosed in FIG. 1 has many applications as in the disclosed embodiment application to automobile air-conditioning, heater and defrost systems. It can be used for zone heating in residential and business buildings and can be in respirators for control of flow of oxygen. It can be used in refrigerator systems for control of refrigerants.

In FIGS. 3(a) and 3(b) the branch point has been illustrated as having a "T" configuration, like parts having the same number as in FIGS. 1 and 2, and a simpler dragmatic illustration of the control arrangement. In FIGS. 4(a) and 4(b) the valve element 30 is shown as having the legs or arms 30a' and 30b' forming a mutual angle of about 105° and in FIG. 4c a slight curvature is given to the surfaces along which fluid flows such curvature being an extension of the curvature of the curved side walls 11L and 11R of the interaction chamber 11. It will be appreciated that several control elements incorporating the invention can, if desired, be connected in series so that a separate control element can be used to direct fluid along a one of a given pair of paths and then branch from the first given path to one given of a further pair of paths. The flow control elements incorporating the invention can also be connected in parallel and mutually or separately controlled.

While the preferred embodiments of the invention have been shown and described, it is entended that modifications may be made by those skilled in the art without departing from the spirit and scope of the invention as defined in the attached claims.

We claim:

1. In a fluid flow control element including a fluid amplifier including a chamber having an interaction region, a fluid flow inlet means and at least one control passageway adjacent said fluid flow inlet, a fluid flow outlet means downstream of, and substantially aligned with said fluid flow inlet,
    a pair of load passageways branching at a branch point from said fluid flow outlet means,
    a valve element,
    pivot means mounting said valve element for rotation, by fluid flow forces of fluid flowing through said fluid flow inlet, at said branch point to direct fluid to flow through a selected one of said load passageways, the improvement wherein said fluid flow inlet, said fluid flow outlet means and the spacing between said inlet and outlet means are such that the fluid pressure in said chamber is always above any pressure in said load passageways and fluid can only flow from said chamber through the selected one of said load passageways and said at least one control passageway, whereby said valve element is rendered relatively insensitive to load conditions at said pair of load passageways,
    and a control member for blocking flow of fluid through said at least one control passageway.

2. The invention defined in claim 1 wherein said valve element is planar.

3. The invention defined in claim 1 including a pair of stop means defining two limits of rotation of said valve element.

4. The invention defined in claim 1 wherein said valve element has a pair of flap members extending from said pivot means to define, with respect to each other, only obtuse angles.

5. The invention defined in claim 1 wherein there are a pair of said control passageways, on opposite sides, respectively, of said fluid flow inlet, and wherein said interaction region has parallel top and bottom walls and a pair of side walls which are mutually concave and curved to convergence beyond said fluid flow outlet, said valve element being rotated on said pivot means such that both ends of said valve element swing through said fluid flow outlet means upon transposition of the curved wall along which said fluid is caused to flow by the blocking of a selected one of said flow control passageways.

6. The invention defined in claim 5 wherein said valve element is flat.

7. The invention defined in claim 6 wherein there are a pair of stop means defining the limits of rotation of said valve element.

8. The invention defined in claim 5 wherein said valve element has a pair of flat surfaces extending to each side of said pivot means and defining therebetween only obtuse angles.

9. In an automobile air flow system having an air impeller, channel means for conveying air from said air impeller to a pair of branching passageways branching to respective load devices, a movable valve element comprising an air flow control means at the branch point of said pair of branching passageways, means pivotally mounting said valve element at said branch point for rotary movement between a pair of stop means so that when said valve element engages one of the stop means air flows through one of said pair of branching passageways and when said valve element engages the other of said stop means, air flows through the other of said pair of branching passageways, and a fluidic amplifier element having an interaction region, fluid inlet, a fluid flow outlet, said amplifier being interposed between said branch points and said channel means for controlling the position of said valve element, and at least one control passageway for deflecting the stream of air from said impeller to one side of said interaction region.

10. The invention defined in claim 9 wherein said amplifier element has an interaction region and said fluid flow inlet and said fluid flow outlet are of sizes such that the pressure induced in said interaction region by said impeller is always greater than ambient.

11. The invention defined in claim 10 wherein said interaction region is defined by a parallel top and bottom walls and a pair of mutually concavely curved side walls which curved sidewalls first diverge from said fluid flow inlet and then converge toward each other to a point beyond said outlet.

12. The invention defined in claim 11 wherein said valve element is flat and has two terminal ends and each said terminal ends of said valve element engages one said pair of stop means, respectively.

13. The invention defined in claim 10 wherein said interaction region is defined by parallel top and bottom walls and a pair of mutually concavely curved side walls, which curved sidewalls first diverge from said fluid flow inlet and then converge toward each other to a point beyond said outlet, said valve element being flat and pivoted at its center whereby the ends of said valve element move through said outlet upon rotation thereof.

14. The invention defined in claim 9 wherein said valve element is planar.

15. In a method of controlling the flow of air in an automobile air flow system having a blower directing air to a branching point and a fluidic amplifier at the branching point directing the air from the blower to one of a pair of load passageways, and a freely pivoted flap member controlled by said fluidic amplifier to one of a pair of positions, each of said positions being where one of said pair of load passageways receives air from said blower and the other of said passageways is blocked thereby and vice versa, said fluidic amplifier having an interaction region and fluid flow inlet and outlet, and at least one control flow passageway, causing the fluid pressure in said interaction region to be greater than ambient whereby air from said impeller flows from said interaction through said at least one control flow passageway.

16. The method defined in claim 15 wherein there are a pair of said flow control passageways and the air from said blower is selectively directed to one of said load passageways by blocking one of said flow control passageways and connecting said other blow control passageway to ambient.

17. In a fluid flow controller having a fluid flow inlet and fluid flow outlet downstream of said fluid flow inlet and a pivotted valve element for directing fluid flow in one of a pair of alternate directions, respectively, through said outlet, the improvement comprising,
a pear-shaped interaction region between said inlet and said outlet,
fluid control passageway means between said pear-shaped chamber and said inlet for causing the fluid flowing in said interaction region to flow on one side or the other of said pear-shaped chamber and
stop means limiting the respective end limits of travel of said pivotted valve element to direct fluid flow along the respective sides of said pear-shaped chamber to one of said pair of alternate directions, respectively.

18. In an air flow control system having an air impeller, channel means for conveying air from said air impeller to a pair of branching passageways branching to respective load devices, air flow control means at the branch point of said pair of branching passageways comprising a valve element, a pair of stop means, means pivotally mounting said valve element at said branch point for rotary movement between said pair of stop means so that when said valve element engages one of the stops air flows through one of said pair of branching passageways and when said valve element engages the other of said stops air flows through the other of said pair of branching passageways, and a fluidic amplifier element having an interaction region, fluid inlet, a fluid flow outlet, said interaction region being defined by a parallel top and bottom walls and a pair of mutually concavely curved sidewalls which curved sidewalls first diverge from said fluid flow inlet and then converge toward each other to a point beyond said outlet, said amplifier being interposed between said branch point and said channel means for controlling the position of said valve element, and at least one control passageway for deflecting the stream of air from said impeller to one side of said interaction region.

19. The invention defined in claim 18 wherein said amplifier element interaction region, fluid flow inlet and fluid flow outlet are of sizes such that the pressure induced in said interaction region by said impeller is always greater than ambient.

* * * * *